US010591962B2

United States Patent
Leigh et al.

(10) Patent No.: US 10,591,962 B2
(45) Date of Patent: Mar. 17, 2020

(54) CAGE ASSEMBLY FOR OPTICAL MODULES

(71) Applicant: HEWLETT PACKARD ENTERPRISE DEVELOPMENT LP, Houston, TX (US)

(72) Inventors: Kevin B Leigh, Houston, TX (US); John Norton, Cypress, TX (US); George D Megason, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/097,257

(22) PCT Filed: Apr. 29, 2016

(86) PCT No.: PCT/US2016/030103
§ 371 (c)(1),
(2) Date: Oct. 28, 2018

(87) PCT Pub. No.: WO2017/188989
PCT Pub. Date: Nov. 2, 2017

(65) Prior Publication Data
US 2019/0113955 A1 Apr. 18, 2019

(51) Int. Cl.
*G02B 6/42* (2006.01)
*G06F 1/18* (2006.01)
*G02B 6/38* (2006.01)

(52) U.S. Cl.
CPC ........... *G06F 1/185* (2013.01); *G02B 6/3817* (2013.01); *G02B 6/428* (2013.01); *G02B 6/4266* (2013.01); *G02B 6/4284* (2013.01); *G06F 1/183* (2013.01)

(58) Field of Classification Search
None
See application file for complete search history.

(56) References Cited

U.S. PATENT DOCUMENTS

| 6,705,769 B2 | 3/2004 | Brezina |
| 6,805,560 B1 | 10/2004 | Budny |
| 7,539,018 B2 | 5/2009 | Murr |
| 8,923,670 B2 | 12/2014 | Zbinden |
| 2004/0175079 A1 | 9/2004 | Goto |
| 2013/0004120 A1* | 1/2013 | Zbinden ............... G02B 6/4232 385/14 |

(Continued)

FOREIGN PATENT DOCUMENTS

JP 2012150395 8/2012

OTHER PUBLICATIONS

"40Gb/s QSFP+ Active Optical Cable," Advanced Fiber Products, LLC., May 14, 2012, <http://www.afpgco.com/pdf/connectivity_solutions/AOC/AFP_Active_Optical_Cable.pdf>.

(Continued)

*Primary Examiner* — Xanthia C Cunningham
(74) *Attorney, Agent, or Firm* — Brooks, Cameron & Huebsch, PLLC

(57) ABSTRACT

In one example, a system for a cage assembly for an optical module includes a receptacle coupled to an interposer card, a number of rails coupled to the interposer card to align an optical module with the receptacle, and a mezzanine card coupled to the interposer card, wherein the optical module is utilized via the mezzanine card.

13 Claims, 4 Drawing Sheets

(56) References Cited

U.S. PATENT DOCUMENTS

| | | | |
|---|---|---|---|
| 2013/0114930 A1* | 5/2013 | Smith | G02B 6/36 385/76 |
| 2013/0156386 A1 | 6/2013 | Miller | |
| 2014/0071632 A1* | 3/2014 | Sunaga | H01L 23/49811 361/728 |
| 2014/0341513 A1* | 11/2014 | Lin | G02B 6/4272 385/89 |
| 2014/0348468 A1* | 11/2014 | Lagziel | G02B 6/4255 385/78 |
| 2015/0063760 A1 | 3/2015 | Pommer | |
| 2015/0137461 A1* | 5/2015 | Coenegracht | G02B 6/4444 277/618 |
| 2015/0234127 A1 | 8/2015 | Paul Chen | |
| 2016/0266340 A1* | 9/2016 | Zhang | G02B 6/32 |
| 2016/0291270 A1* | 10/2016 | Wang | G02B 6/4277 |
| 2017/0017052 A1* | 1/2017 | Costello | G02B 6/4284 |
| 2017/0168253 A1* | 6/2017 | Wilcox | G02B 6/4269 |

OTHER PUBLICATIONS

PCT/ISA/KR, International Search Report and Written Opinion dated Jan. 19, 2018, PCT/US2016/030103, 12 pages.

* cited by examiner

CAGE ASSEMBLY FOR OPTICAL MODULES

BACKGROUND

Computing systems can include a system board with a number of socket connectors to couple module boards to the system board. The module boards can be hot-pluggable transceiver modules. The hot-pluggable transceiver modules, such as 1-lane Small Form Factor Pluggable (SFP), 4-lane Quad Small Form Factor Pluggable (QSFP), and 12-Lane CXP, can be used for network data communications. The transceiver modules can be hot-pluggable to the system board, such as a printed circuit board of a network interface controller (NIC) installed in a server system. A system board can be behind a faceplate where connectors for coupling communication cables (e.g., fiber optic cables) to the transceiver modules are arranged.

DETAILED DESCRIPTION

A number of examples for a cage assembly for an optical module are described herein. In one example, a system for a cage assembly for an optical module includes a receptacle coupled to an interposer card, a number of rails coupled to the interposer card to align an optical module with the receptacle, and a mezzanine card coupled to the interposer card, wherein the optical module is utilized via the mezzanine card. In some examples, the system for a cage assembly for an optical module can be utilized to embed an optical transceiver paddle card and electrical receptacle to the mezzanine card such that the optical transceiver paddle card acts as an embedded optical module on the mezzanine card.

In some examples, the system can be utilized to couple PCIe adapter cards for stand-up cards and open source specifications mezzanine cards such as Open Compute Project (OCP) mezzanine cards. In some examples, the system can provide a user with a choice of an optical transceiver for each of a plurality of computing devices (e.g., servers, mezzanine cards, system boards, etc.). For example, the system can make the optical module serviceable (e.g., capable of being removed, replaced, and/or upgraded, etc.). In addition, the system can include a lower financial cost compared to systems with a custom embedded mid-board optical transceiver.

Figure 1:
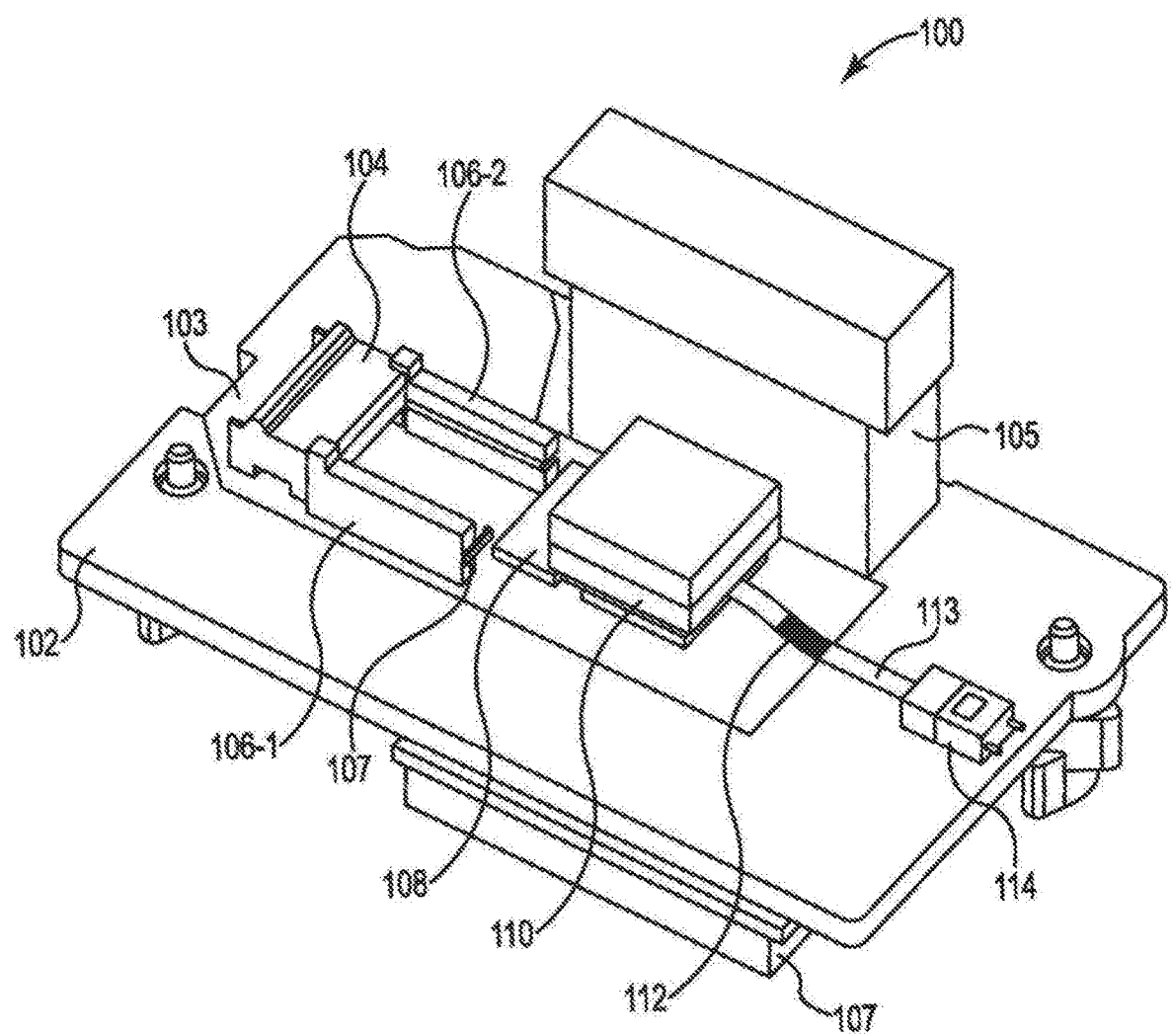
FIG. 1 illustrates a diagram of an example of a system for a cage assembly for an optical module consistent with the present disclosure.

FIG. 1 illustrates a diagram of an example of a system 100 for a cage assembly for an optical module consistent with the present disclosure. In some examples, the system 100 can be utilized to embed an optical module 108 to a mezzanine card 102. As used herein, the mezzanine card 102 can include a PCI mezzanine card (e.g., PMC, etc.) that can include a printed circuit board assembly.

As described herein, the optical module 108 can be an optical transceiver paddle card. In some examples, the optical transceiver paddle card can be a generic paddle card (e.g., "off the shelf" paddle card, manufactured to be utilized on a plurality of different platforms, etc.). As described herein, a generic paddle card can be less expensive compared to embedded optical transceivers. In some examples, the optical module 108 can be a standards compliant optical module such as a multi-source agreement (MSA) compliant optical module. As used herein, an MSA is an agreement between multiple manufacturers to make products which are compatible across vendors, acting as de facto standards, establishing a competitive market for interoperable products. Accordingly, the MSA specifies form factor, electrical interfaces, operating characteristics and other properties for the products. Products that adhere to MSAs (i.e., MSA compliant) include optical transceivers, fiber optic cables, and other networking devices. In some examples, the MSA optical module can include a quad small form-factor pluggable (QSFP) optical module. As used herein, the optical module 108 can be a hot-pluggable transceiver used for telecommunication and/or data communication applications.

In some examples, the system 100 can include an interposer card 103 that is coupled to the mezzanine card 102. In some examples, the interposer card 103 can be coupled to the mezzanine card 102 via a converter module (e.g., press-fit pin converter, etc.). In some examples, the interposer card can include an electrical interface between a number of cards and/or modules. For example, the interposer card 103 can be an interface between the mezzanine card 102 and the optical module 108. In some examples, the system 100 can include a network controller 107. In some examples, the network controller 107 on the mezzanine card 102 can be electrically coupled to the optical module 108 on the interposer card 103 via a converter module.

In some examples, the system 100 can include a receptacle 104 coupled to the interposer card 103. In some examples, the receptacle 104 can be utilized to receive the optical module 108. In some examples, the receptacle 104 can provide an electrical interface between the optical module 108 and the interposer card 103. For example, the receptacle 104 can be utilized to transfer a number of signals between the optical module 108 and the interposer card 103. In some examples, the receptacle 104 can be a multi-source agreement (MSA) receptacle. In some examples, the MSA receptacle can include a quad small form-factor pluggable (QSFP) receptacle.

In some examples, the system 100 can include a number of rails 106-1, 106-2 that are coupled to the interposer card 103 and/or the receptacle 104. In some examples, the number of rails 106-1, 106-2 can be utilized to receive the optical module 108. In some examples, the number of rails 106-1, 106-2 can be utilized to align the optical module 108 with the receptacle 104. For example, the number of rails 106-1, 106-2 can be utilized to guide connectors (e.g., electrical connectors, pin connectors, etc.) of the optical module 108 with the receptacle 104 when coupling the optical module 108 to the receptacle 104.

In some examples, the number of rails 106-1, 106-2 can include a retention mechanism 107. In some examples, the retention mechanism 107 can lock the optical module 108 in a particular position when the connectors of the optical module 108 are coupled to the receptacle 104. In some examples, the retention mechanism 107 can be a spring loaded mechanism that can lock the optical module 108 to the receptacle 104 and number of rails 106-1, 106-2. For example, the retention mechanism 107 can lock the optical module 108 when the optical module 108 is electrically coupled to the receptacle.

In some examples, the optical module 108 can be coupled to an optical connector 114 via a number of jumper fibers 113. In some examples, the jumper fibers 113 can be utilized to transfer signals between the optical module 108 and a different device (e.g., different computing device, different computing module, system board, etc.). In some examples, the system 100 can include a cable manager 112 coupled to the interposer card 103 to couple jumper fibers 113 of the optical module 108 to the interposer card 103. In some examples, the cable manager 112 can prevent movement of the jumper fibers 113. In some examples, the connector 114 can be a blind-mate optical connector that can be utilized to couple the optical module 108 to a system board.

In some examples, the system 100 can include a heat sink 110 mechanically coupled to the optical module 108. In some examples, the heat sink 110 can be coupled to the optical module 108 via a retention mechanism (not shown). In some examples, the heat sink 110 can be coupled to the optical module 108 when the retention mechanism is coupled to the number of rails 106-1, 106-2.

In some examples, the system 100 can include a connector 105 (e.g., system connector) coupled to the mezzanine card 102. In some examples, the connector 105 can be utilized to couple the mezzanine card 102 to a system board (e.g., motherboard, etc.). In some examples, the connector 105 can electrically couple the mezzanine card 102 to the system board. In some examples, the connector 105 can be utilized to transfer peripheral component interconnect express (PCIe) signals between the mezzanine card 102 and the system board. In some examples, the system connector 105 can be utilized to transfer power and management signals between the mezzanine card 102 and the system board. In some examples, the system board can utilize the optical module 108 as an embedded optical module via the mezzanine card 102 and interposer card 103.

As described herein, the system 100 can be utilized to integrate an optical module 108 to a system board utilizing a receptacle 104 coupled to an interposer card 103 that is coupled to a mezzanine card 102. In some examples, the system 100 can be utilized to provide an optical module 108 that can act as an embedded optical module. In addition, the optical module 108 can be a serviceable optical module (e.g., capable of being removed, replaced, and/or upgraded, etc.).

Figure 2:
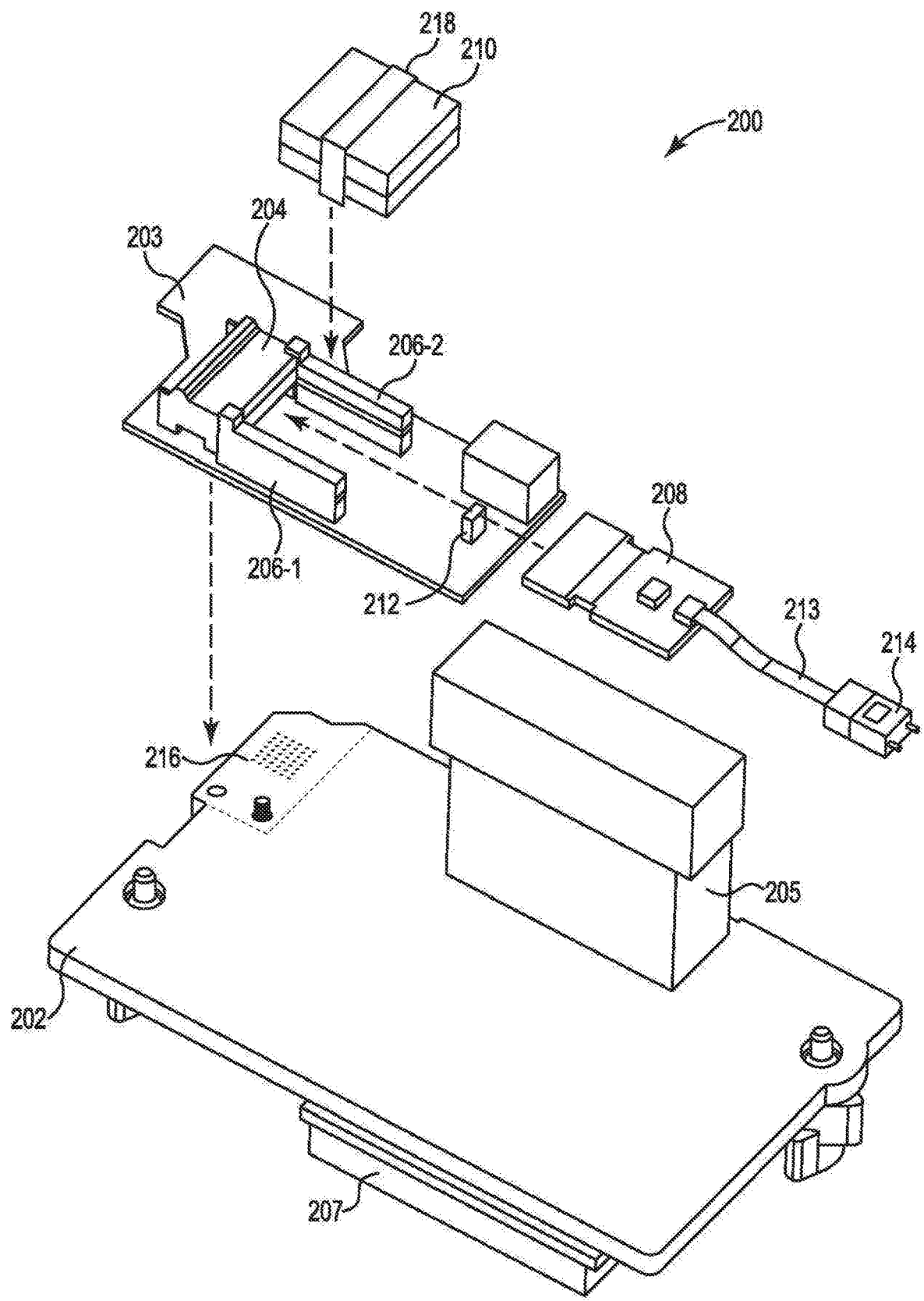
FIG. 2 illustrates a diagram of an example of a system for a cage assembly for an optical module consistent with the present disclosure.

FIG. 2 illustrates a diagram of an example of a system 200 for a cage assembly for an optical module consistent with the present disclosure. The system 200 can illustrate an exploded view of system 100 as referenced in FIG. 1. For example, the system 200 can include a mezzanine card 202, an interposer card 203, a receptacle 204, a number of rails 206-1, 206-2, an optical module 208, jumper fibers 213, an optical connector 214 (e.g., blind-mate optical connector, etc.), a cable manager 212, a heat sink 210, and a heatsink retention mechanism 218.

The system 200 can include a connection interface 216 for coupling the mezzanine card 202 and the interposer card 203. As described herein, the connection interface 216 can include a converter to allow signals to be sent between the mezzanine card 202 and the interposer card 203. For example, the connection interface 216 can include a press-fit pin converter to couple the mezzanine card 202 to the interposer card 203. In some examples, the system 200 can include a network controller 207. In some examples, the network controller 207 on the mezzanine card 202 can be electrically coupled to the optical module 208 on the interposer card 203 via a converter module. In some examples, the system 200 can include a locking mechanism to couple the mezzanine card 202 to the interposer card 203. For example, a screw can be utilized physically couple the mezzanine card 202 to the interposer card 203.

As described herein, the system 200 can be utilized to integrate an optical module 208 to a mezzanine card 202 utilizing a receptacle 204 coupled to an interposer card 203 that is coupled to a mezzanine card 202 by the connection interface 216. In some examples, the system 200 can be utilized to provide an optical module 208 that can act as an embedded optical module. In addition, the optical module 208 can be a serviceable optical module (e.g., capable of being removed, replaced, and/or upgraded, etc.).

Figure 3:
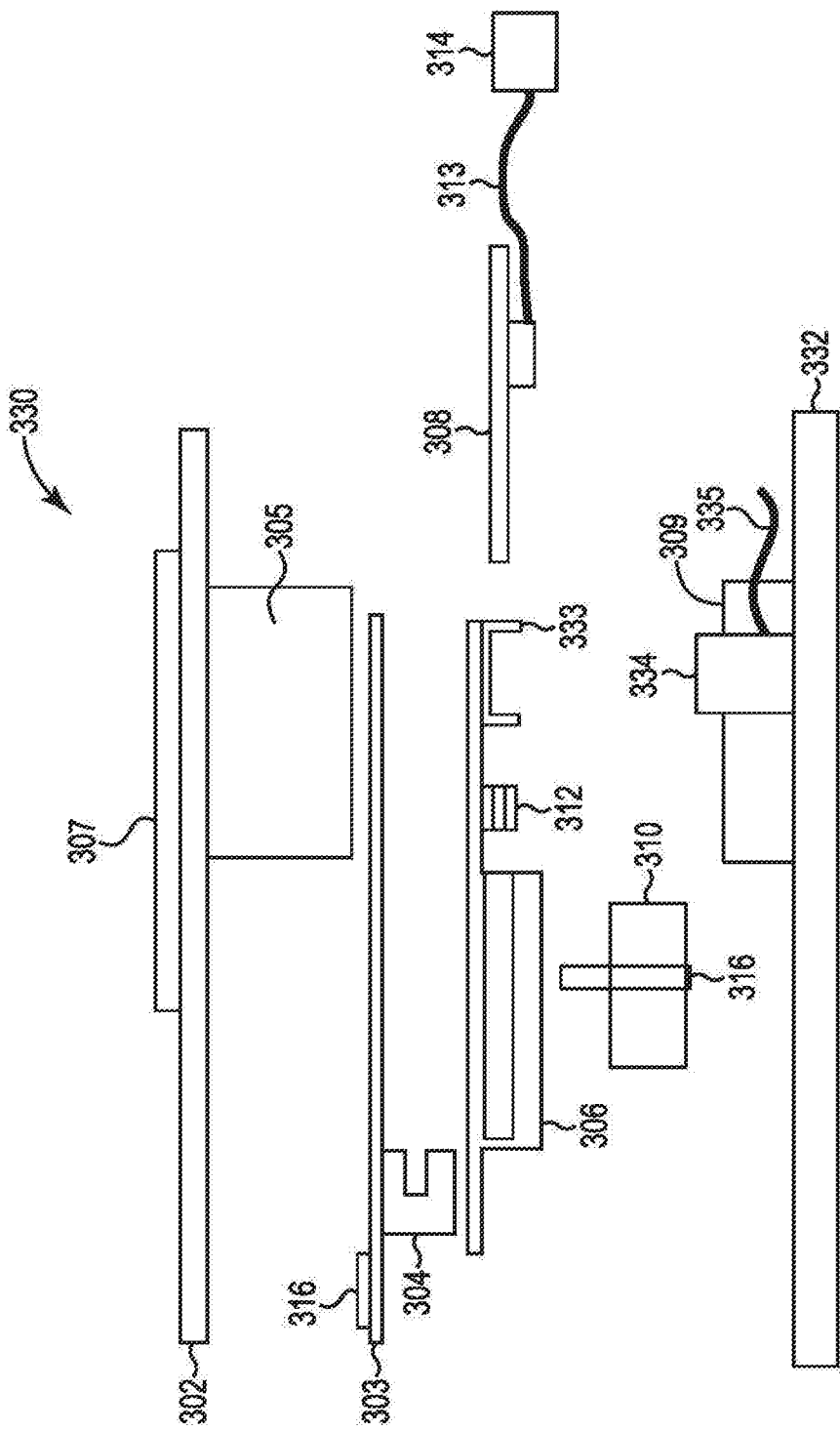
FIG. 3 illustrates a diagram of an example of a system for a cage assembly for an optical module consistent with the present disclosure.

FIG. 3 illustrates a diagram of an example of a system 330 for a cage assembly for an optical module consistent with the present disclosure. In some examples, the system 330 can illustrate an example of how an interposer card 303 can be coupled to a mezzanine card 302 and how the mezzanine card 302 can be coupled to a system board 332. In some examples, the system 330 can be utilized to embed an optical module 308 to the mezzanine card 302. In some examples, the optical module 308 can be electrically coupled to the network controller 307 on the mezzanine card 302 via the receptacle 304 and the connection interface 316. The network controller 307 electrically couples to the system board 332 via the system connector 305 and mezzanine connector 309.

In some examples, the system 330 can include a mezzanine card 302 with a system connector 305. As described herein, the system connector 305 can be utilized to electrically couple the mezzanine card 302 to the system board 332 via the mezzanine connector 309. In some examples, the system 330 can include an interposer card 303. As described herein, the interposer card 303 can be coupled to the mezzanine card 302 by a connection interface 316.

In some examples, the interposer card 303 can include a receptacle 304. As described herein, the receptacle 304 can be utilized to electrically couple an optical module 308 to the interposer card 303. For example, the receptacle 304 can enable signal transfers between the optical module 308 on the interposer card 303 and the network controller 307 on the mezzanine card 302. In some examples, the optical module 308 can include a number of jumper cables 313 to couple the optical module 308 to an optical connector 314. In some examples, the optical connector 314 can be physically coupled to the interposer card 303 via a connector retainer 333. In some examples, the optical connector 314 can be coupled to an optical connector 334 of the system board 332. In some examples, the connector 334 includes an optical cable 335 to optically couple to a different system board. In some examples, the optical connector 314 can be a blind-mate connector that can be utilized to couple the optical module 308 to the system board 332. As used herein, a blind-mate connector can be utilized to couple multiple devices without having to visually align the coupling. For example, the blind-mate connector can enable a user to couple the mezzanine card 302 to the system board 332 when the user is unable to visually see the optical connector 314 couple to the optical connector 334. In some examples, the optical module 308 can be utilized to send signals between the mezzanine card 302 and a different system board.

In some examples, the system 330 can include a number of rails 306 that can be utilized to physically couple the optical module 308 to the interposer card 303. In some examples, the number of rails 306 can be coupled to the interposer card 303 and/or coupled to the receptacle 304. In some examples, the number of rails 306 can be utilized to guide the optical module 308 into the receptacle such that the connectors of the optical module 308 are aligned with the connectors of the receptacle 304. As described herein, the receptacle 304 can be utilized to electrically couple the optical module 308 to the interposer card 303.

In some examples, the system 330 can include a cable manager 312 coupled to the interposer card 303 to couple jumper fibers 313 of the optical module 308 to the interposer card 303. In some examples, the system 330 can include a heat sink 310 that can be coupled to the optical module 308 when a retention mechanism 316 is coupled to the number of rails 306. For example, the retention mechanism 316 can be clip that can lock into the number of rails 306 to physically couple the heat sink 310 to the optical module 308.

Figure 4:
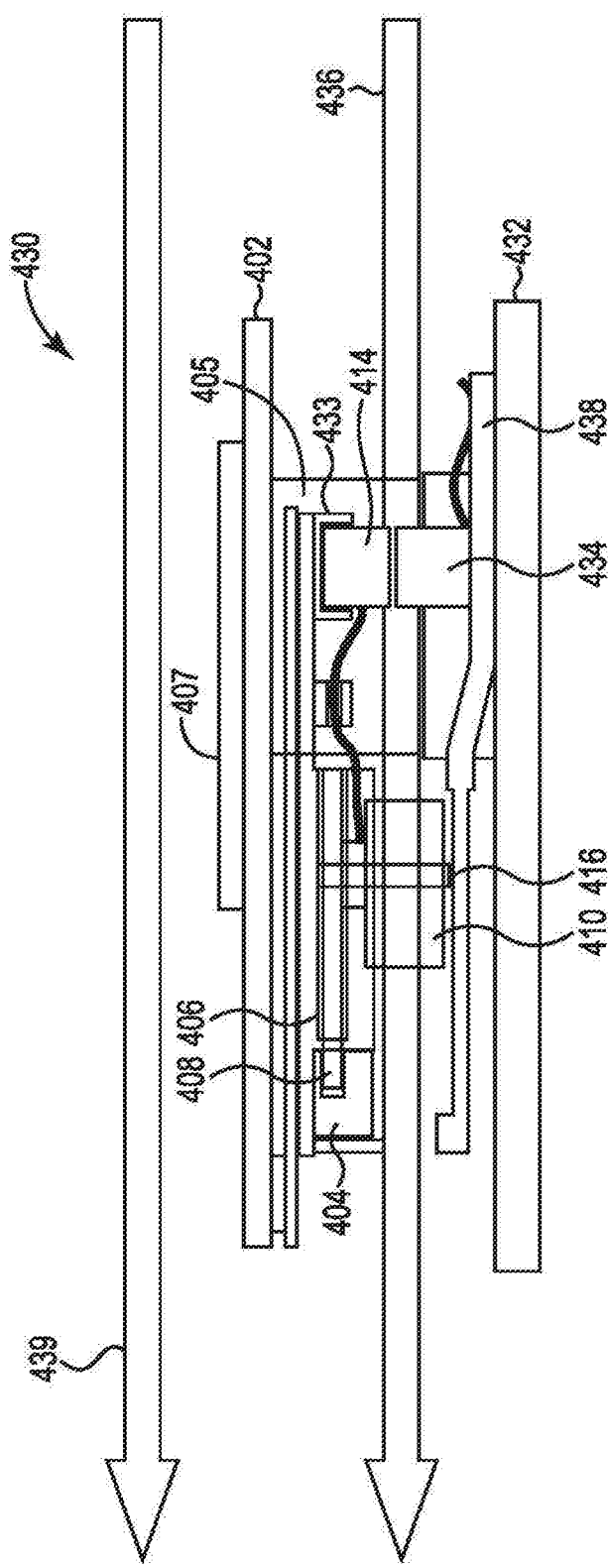
FIG. 4 illustrates a diagram of an example of a system for a cage assembly for an optical module consistent with the present disclosure.

FIG. 4 illustrates a diagram of an example of a system 430 for a cage assembly for an optical module consistent with the present disclosure. In some examples, the system 430 can illustrate system 330 as referenced in FIG. 3 when the elements of system 330 are coupled together. For example, the system 430 can illustrate: when the optical module 408 is coupled to the receptacle 404, when the connector 414 is coupled to the connector 434, when the connector 414 is coupled to a connector retainer 433, and/or when the heat sink 410 is coupled to the optical module 408.

In some examples, the system 430 can include a mezzanine card 402 coupled to a system board via a connector 405. In some examples, the system 430 can include an air baffle 438 coupled to the system board 432. In some examples, the air baffle 438 can be utilized to direct airflow between the mezzanine card 402 and the system board 432. For example, the air baffle 438 can be utilized receive and direct cool air in the direction of arrow 436. In some examples, the air baffle 438 can be utilized to direct cool air across the heat sink 410 coupled to the optical module 408 via the retention mechanism 416. In some examples, the cool air direction 436 is isolated from the hot air direction 439 (e.g., air that is relatively warmer than the cool air) that passes over the network controller 407. In some examples, the hot air direction 439 may be air that is downstream from other processors of the system 430.

As used herein, "a" or "a number of" something can refer to one or more such things. For example, "a number of widgets" can refer to one or more widgets. The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system for a cage assembly for an optical module, comprising:
    a receptacle coupled to an interposer card;
    a number of rails coupled to the interposer card to align an optical module with the receptacle;
    a mezzanine card coupled to the interposer card, wherein the optical module is utilized via the mezzanine card; and
    a retention mechanism to couple the optical module to the interposer card, wherein the retention mechanism is coupled to a heat sink.

2. The system of claim 1, wherein the optical module is an optical transceiver paddle card.

3. The system of claim 1, comprising a cable manager coupled to the interposer card to couple jumper fibers of the optical module to the interposer card.

4. The system of claim 1, comprising an air baffle coupled between the mezzanine card and a system board.

5. The system of claim 1, comprising a connection interface to couple the interposer card to the mezzanine card.

6. A cage assembly for an optical module, comprising:
    a receptacle coupled to a number of rails to receive an optical module, wherein the number of rails align the optical module with the receptacle;
    a retention mechanism coupled to the number of rails to couple a heat sink to the optical module; and
    a blind-mate connector coupled to the optical module via jumper fibers.

7. The cage assembly of claim 6, comprising a cable manager coupled to the jumper fibers of the optical module.

8. The cage assembly of claim 6, wherein the receptacle is coupled to an interposer card.

9. The cage assembly of claim 6, wherein the number of rails include a retention mechanism to lock the optical module to the receptacle.

10. A system for a cage assembly for an optical module, comprising:
    a receptacle coupled to an interposer card to couple a MSA paddle card optical module to the interposer card;
    a number of rails coupled to the interposer card to align the MSA paddle card optical module with the receptacle;
    a retention clip coupled to the number of rails to couple a heat sink to the MSA paddle card optical module; and
    a blind-mate optical connector coupled to the paddle card optical module, wherein the blind-mate optical connector couples the interposer card to a system board.

11. The system of claim 10, wherein the receptacle includes a standards compliant receptacle and wherein the paddle card optical module includes a standards compliant paddle card optical module, and wherein the paddle card optical module is coupled to the blind-mate optical connector via a number of jumper fibers.

12. The system of claim 11, wherein the number of jumper fibers are coupled to the interposer card via a cable manager.

13. The system of claim 10, comprising a connector to electrically couple the interposer card to a system board.

* * * * *